United States Patent
Laquai (10) Patent No.: US 6,961,745 B2
(45) Date of Patent: Nov. 1, 2005

(54) FILTER FOR INJECTING DATA DEPENDENT JITTER AND LEVEL NOISE

(75) Inventor: Bernd Laquai, Stuttgart (DE)

(73) Assignee: Agilent Technologies, Inc., Palo Alto, CA (US)

( * ) Notice: Subject to any disclaimer, the term of this patent is extended or adjusted under 35 U.S.C. 154(b) by 617 days.

(21) Appl. No.: 09/975,431

(22) Filed: Oct. 11, 2001

(65) Prior Publication Data

US 2002/0174159 A1 Nov. 21, 2002

(30) Foreign Application Priority Data

Apr. 3, 2001 (EP) .............................. 01108337

(51) Int. Cl.[7] ................................................ G06G 7/02
(52) U.S. Cl. ..................................................... 708/819
(58) Field of Search .................................... 708/819, 3

(56) References Cited

U.S. PATENT DOCUMENTS

| | | | |
|---|---|---|---|
| 5,121,342 A | | 6/1992 | Szymborski et al. |
| 5,172,357 A | * | 12/1992 | Taguchi .................. 369/47.28 |
| 5,309,428 A | | 5/1994 | Copley et al. |
| 5,751,766 A | | 5/1998 | Kletsky et al. |
| 6,076,175 A | | 6/2000 | Drost et al. |

FOREIGN PATENT DOCUMENTS

GB    2 146 205 A    4/1985

OTHER PUBLICATIONS

Van Valkenburg, Network Analysis, 3rd Edition, 1974 by Prentice–Hall, Inc., pp. 83–84.*

D/L Pinta Balle.., L., Examiner. European Search Report, Application No. EP 01 10 8337, dated Sep. 11, 2001.

* cited by examiner

*Primary Examiner*—Tan V. Mai (57) ABSTRACT

A filter for injecting data dependent jitter and level noise into a digital data signal with a given data rate reacts on a step function with a step response showing after a first increase or decrease a substantial extreme value, such as a minimum or a maximum, of opposite direction than the first increase or decrease. The temporal occurrence of the substantial extreme value with respect to the step function is substantially in the range of the given data rate.

12 Claims, 10 Drawing Sheets

FILTER FOR INJECTING DATA DEPENDENT JITTER AND LEVEL NOISE

BACKGROUND OF THE INVENTION

1. Field of the Invention

The present invention relates to testing data transmission in and with digital circuits.

2. Discussion of the Background Art

High-speed IO (input/output) interfaces embedded into today's communication devices approach Terabit bandwidth. The architecture allowing this bandwidth boost is based on a parallel arrangement of serializer/deserializer cells running at data rates of several Gigabit per second and performing an independent serial data transmission on each lane in parallel (SerDes multilane interface). However, economic production testing of such interfaces imposes a significant challenge. Instrument based solutions are costly and slow and the test approach of using a simple loopback between transmit and receive portion of the SerDes does not cover faults resulting from data signals exposed to jitter and level noise.

SUMMARY OF THE INVENTION

It is an object of the invention to improve the test methodology for cost efficiently testing devices e.g. with embedded high-speed IO interfaces. The object is solved by the independent claims. Preferred embodiments are shown by the dependent claims.

A filter is provided for injecting data dependent jitter and level noise into a digital data signal with a given data rate. The filter reacts on a step function with a step response showing after a first increase or decrease a substantial extreme value, such as a minimum or a maximum, of opposite direction than the first increase or decrease. The temporal occurrence of the substantial extreme value with respect to the step function is substantially in the range of the given data rate.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DESCRIPTION OF THE INVENTION

The invention is based on the finding that jitter will be injected into a data signal 1 (upper part of FIG. 1) under the influence of passive components or devices, thus representing a passive linear filter injecting data dependent jitter. The effect of jitter injection shall now be explained in detail for higher-order filters (i.e. filters of at least second order). However, it is clear that the effect of jitter injection already occurs with first order filters although less controllable and in particular less suitable for adjusting the behavior to the data rate of the data signal 1. Also, other filter types can be used accordingly, such as non-linear or active filters, however might be subject to limited usability only for lower frequency applications.

Figure 1:
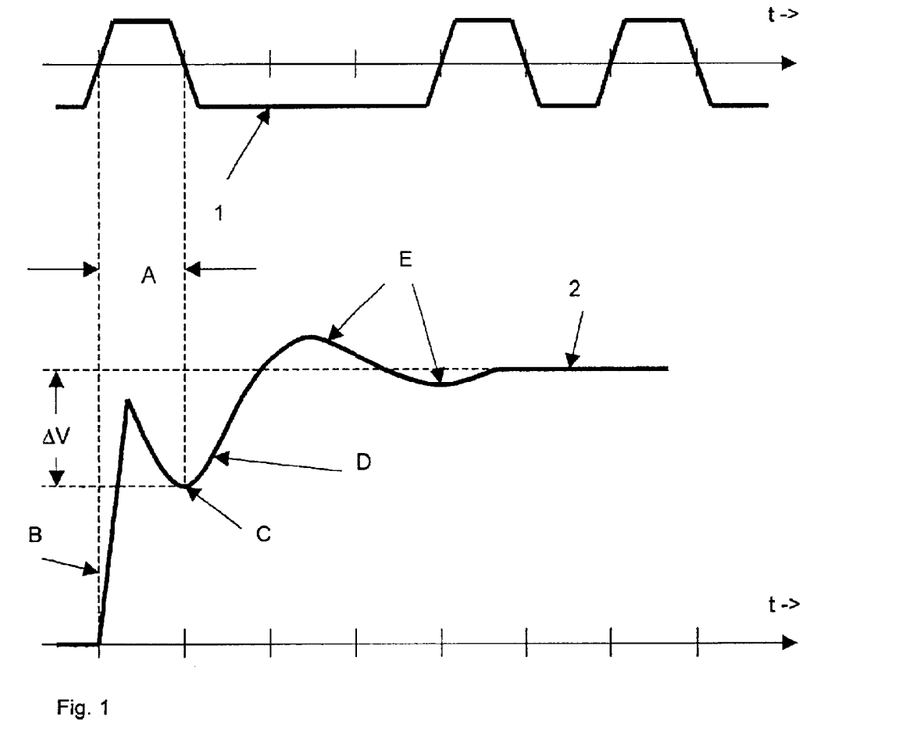
FIGS. 1, 2a–f, 3a–b, 4a–b, 5a–b and 6 illustrate the principles for jitter injection according to the present invention.

In a preferred embodiment as shown in the lower part FIG. 1, a filter 20 (see preferred embodiment of filter 20 in FIGS. 7 and 8) of reacts with a step response 2 to a step signal having a finite rise time. The step response 2 shows the following characteristics: A dominant negative peak D follows an initial rising edge B of the data signal 1. The occurrence of a relative minimum C of the dominant negative peak D is preferably adjusted that it substantially matches with a bit interval time A of the data signal 1. The relative minimum C shows an amplitude drop of $\Delta V$ with respect to the amplitude or the step response 2 in its steady state. After the dominant negative peak D, a ripple or oscillation E of smaller amplitude may follow but is of no importance to the invention.

The filter step response 2 causes jitter injection into the data signal 1 due to superimposition of subsequent step responses. The positive or negative steps representing the individual digital bits in the data signal 1 cause the superimposed step responses. Jitter is induced at the logic threshold of the decision circuit that evaluates the bit values in the data signal output from the jitter injection filter.

FIGS. 2a–f show schematically how superimposition of subsequent step responses of opposite polarity is used to induce the jitter. For the sake of better understanding, the dominant negative peak D shall be matched to the bit interval time A, so that the relative minimum C occurs after the bit interval time A. Thus, the full amplitude drop of $\Delta V$ can be utilized for jitter injection. It is clear that variations of the relative minimum C away from the bit interval time A will also lead to jitter injection, however not utilizing the full possible range of the amplitude drop of $\Delta V$.

Figure 2A:
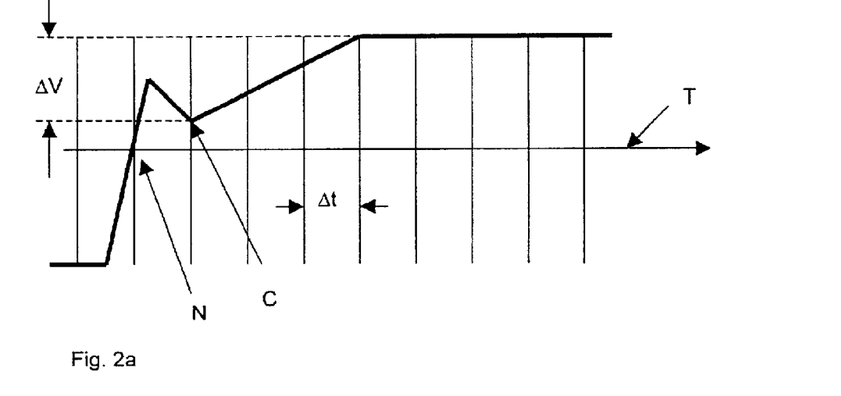
Figure 2B:
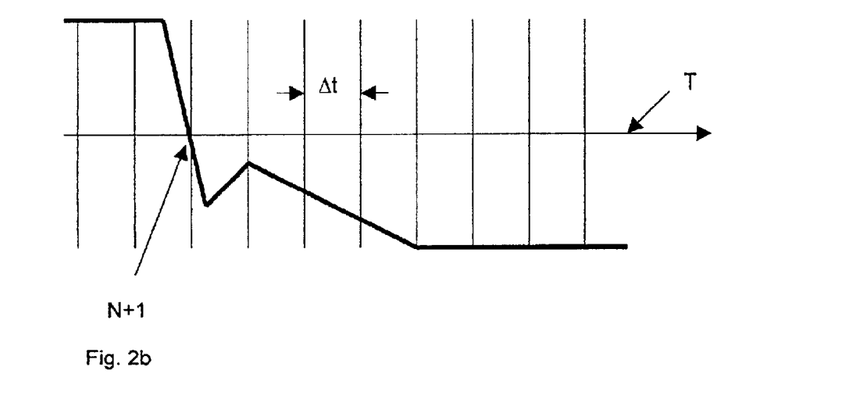
Figure 2C:
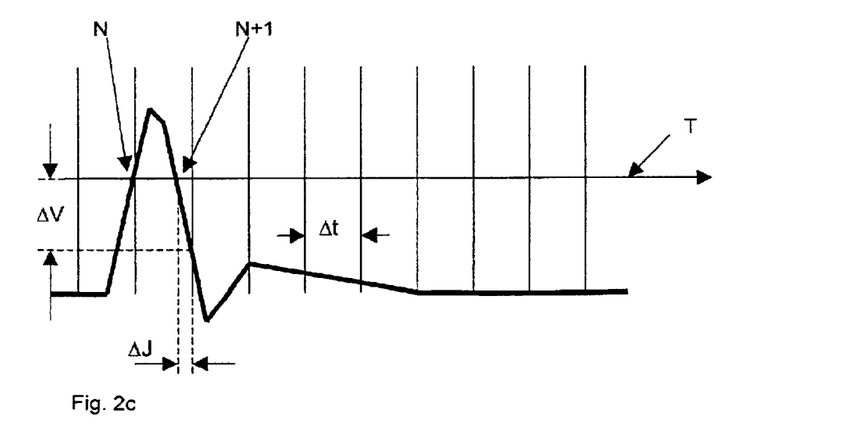

FIG. 2a shows schematically a step response N to a positive step related to a bit n. The dominant negative peak D causes the relative minimum C. FIG. 2b show a step response N+1 to a negative step related to a successive bit n+1 of opposite logic value occurring one bit interval time $\Delta t$ (corresponding to the data rate A of the data signal 1) later than the bit n. The superimposition of both step responses N and N+1 is shown in FIG. 2c. The peak with relative minimum C of step response N and the falling edge in the negative step N+1 become superimposed in a way that the falling edge of the resulting signal is displaced to a lower amplitude by exactly the size $\Delta V$ of the dominant negative peak D at the time of its crossing of a threshold T. Due to the limited transition time of the edges in the data signal 1, the amplitude displacement $\Delta V$ is translated into a time displacement $\Delta J$. The displacement $\Delta J$ represents a time offset with respect to the desired threshold crossing time.

Figure 2D:
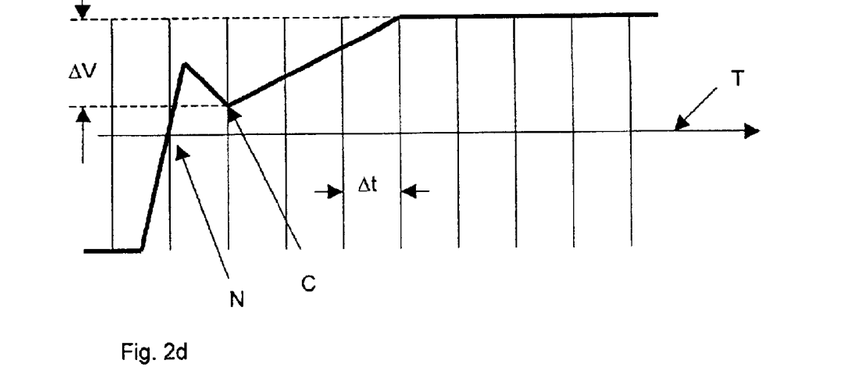
Figure 2E:
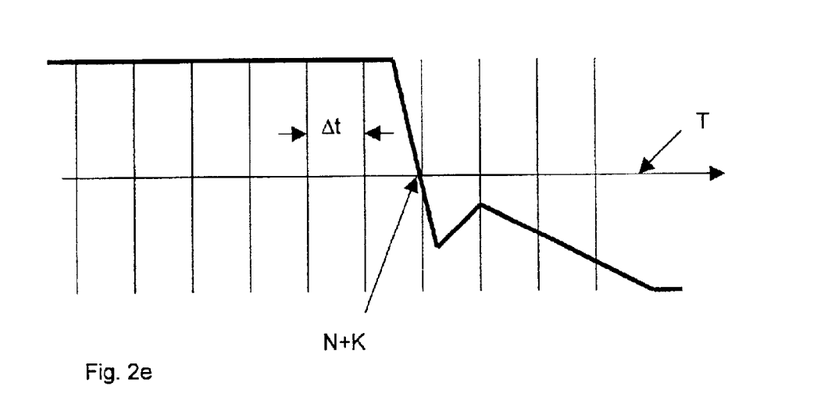
Figure 2F:
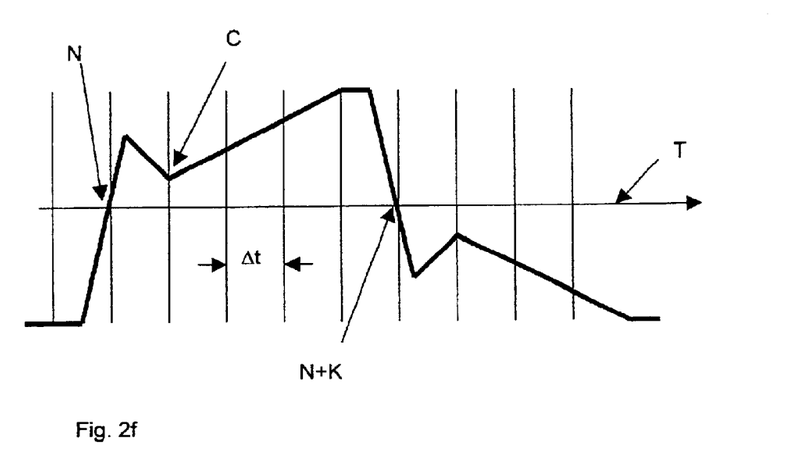

A time offset does not occur when the positive step N of bit n is followed by many bits of same value before a bit of opposite value causes a negative step (as shown in FIGS. 2d–f). In this case the step response N of bit n can settle to its final value before the negative step occurs. FIG. 2d shows again (as in FIG. 2a) the positive step N of bit n with the dominant negative peak and its relative minimum C. FIG. 2e shows the step response N+K to a negative step n+k occurring K bits later than bit n and without a bit value change in between. FIG. 2f shows the superimposition of both step responses N and N+K. A peak in the step response N of the previous bit n does not displace the falling edge of the negative step N+K at that time. Therefore the resulting falling edge causes the crossing of threshold T at the expected bit time.

In real data signals with random content, the run length of bits with same values varies, so that superimpositions between the two extrema of the case described in FIGS. 2a–c (fast toggling of bit values, short run length) and the case described in FIGS. 2d–f (slow toggling of bit values, long run length) occur. Run lengths allowing only partial settling of the step response thus represent intermediate cases with time offsets of less than ΔJ.

Thus, the generated negative peak (D) with its size ΔV results in the maximum amplitude ΔJ of the injected jitter. As will be described later, this implies that also a controlled amount of level noise will be injected simultaneously such that a so-called data eye (see FIGS. 3a–b) of the resulting signal will not only be closed horizontally but also vertically in a very controlled way.

Figure 3A:
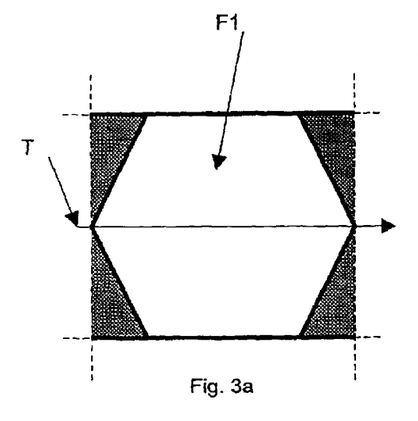
Figure 3B:
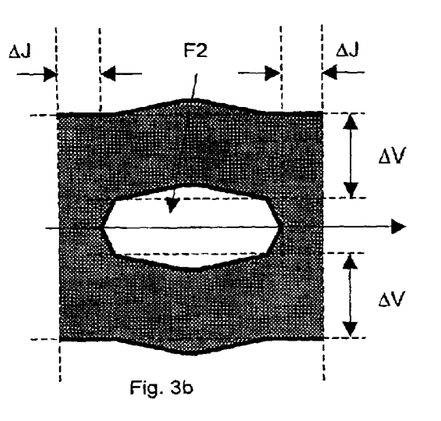

FIGS. 3a–b illustrate the consequence of the inventive injection mechanism using the so-called eye diagram representation. A data eye diagram is derived by an overlay of several (and preferably all) step responses caused by several (and preferably all) bits in a data sequence (such as data signal 1). Eye diagrams are well known in the art and need not be further specified here.

FIG. 3a depicts a typical schematic eye diagram for an unfiltered data signal. The eye diagram of FIG. 3a shows a large inner open eye area F1 where the logical value of a bit can be determined without error. FIG. 3b shows a schematic eye diagram for a data signal filtered with the filter in accordance to the above said. The eye diagram of FIG. 3b shows a significantly reduced inner eye area F2 where the logical value of a bit can be determined without error. This inner area can be precisely controlled with the parameter of the negative dominant peak size ΔV.

The boundary of the inner eye F2 is limited to the left and to the right by the injected jitter ΔJ. Another important effect is that level noise equivalent to the size ΔV of the dominant negative peak D is injected (see FIG. 3b). This is the result of the fact that each positive step generates a relative minimum C. When more bits of the same values follow (i.e. bits at the data rate Δt), that causes the upper inner eye boundary to close at that level ΔV. The same applies for negative steps, so that the lower boundary of the inner eye also closes with ΔV. Therefore the inner eye area is also closed vertically in a very controlled way.

A jitter injection filter of a preferred embodiment is of second order. Thus, the jitter injection filter can be obtained with less as possible filter complexity, e.g. for economic reasons, ease of technical implementation and control. The jitter injection filter synthesis is deduced from the description of a second order system in the frequency domain:

$$F(S) = K \cdot \frac{(S-z_1) \cdot (S-z_2)}{(S-p_1) \cdot (S-p_2)} = K \cdot \frac{S^2 + \alpha S + 1}{S^2 + \beta S + 1} \quad S = \sigma + i\omega$$

Figure 4A:
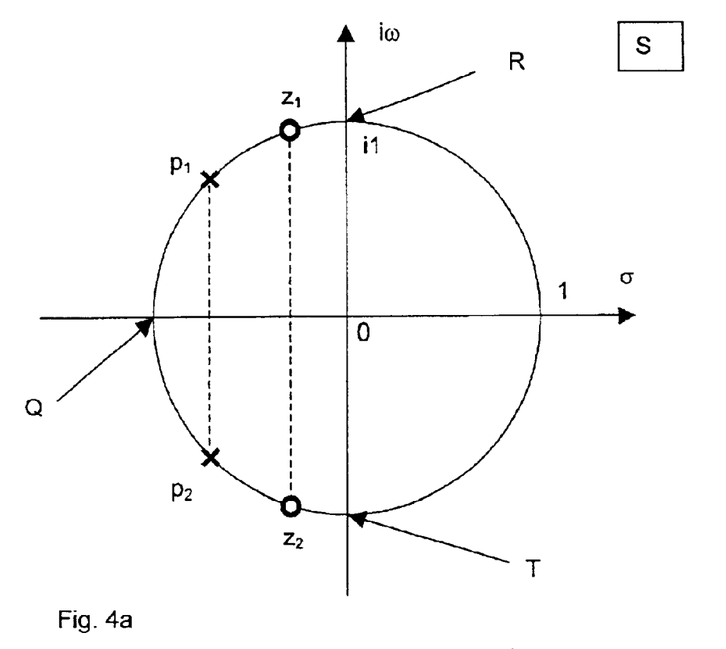

In this formula, $z_1$ and $z_2$ represent the zeros and $p_1$ and $p_2$ represent the poles. Constants α and β visualize the location of zeros indicated with O and the poles indicated with X on the unit circle in the normalized complex frequency domain (FIG. 4a). Varying the constant α between 0 and 2 generates conjugate complex poles and zeros and moves the pole $p_1$ from the point S=0+i1 (R) to point S=−1+i0 (Q) and pole $p_2$ from the point S=0−i1 (T) to point S=−1+i 0. The same applies to the zeros $z_1$ and $z_2$ when varying β from 0 to 2.

Figure 4B:
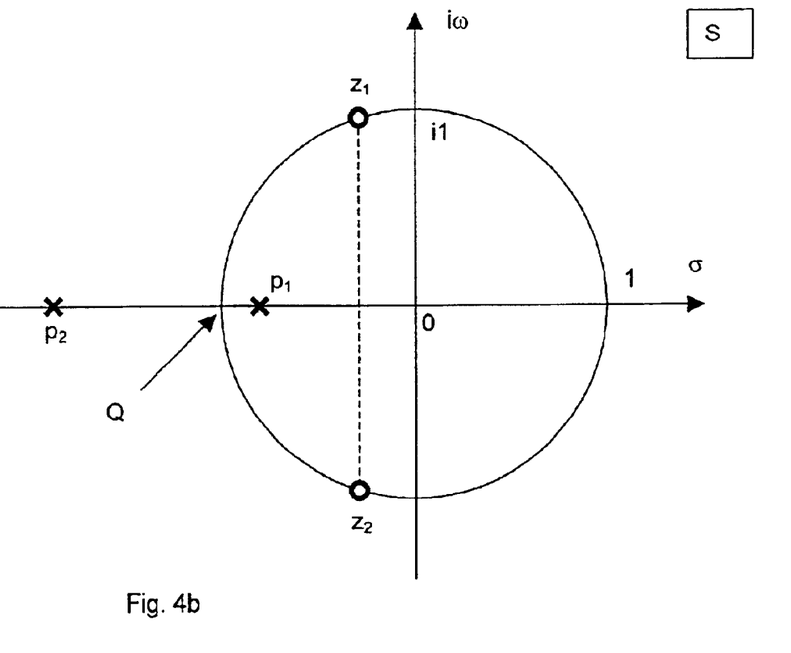

Another important case of pole zero location is shown in FIG. 4b. When varying the constant β between 2 and positive infinity, both poles are located on the real axis and the pole $p_1$ is moved from point Q towards the origin 0+i0, and pole $p_2$ is moved on the real axis towards negative infinity −∝+i0.

A preferred embodiment of the second order filter is obtained either when both zeros are located on the unit circle and are closer to the imaginary axis than the poles (FIG. 4a), or when the zeros are located on the unit circle while having the poles on the real axis (FIG. 4b). In this preferred embodiment, the location of poles and zeros are intentionally under control to adjust horizontal and vertical eye closure and allow adaptation to a given data rate.

Figure 5A:
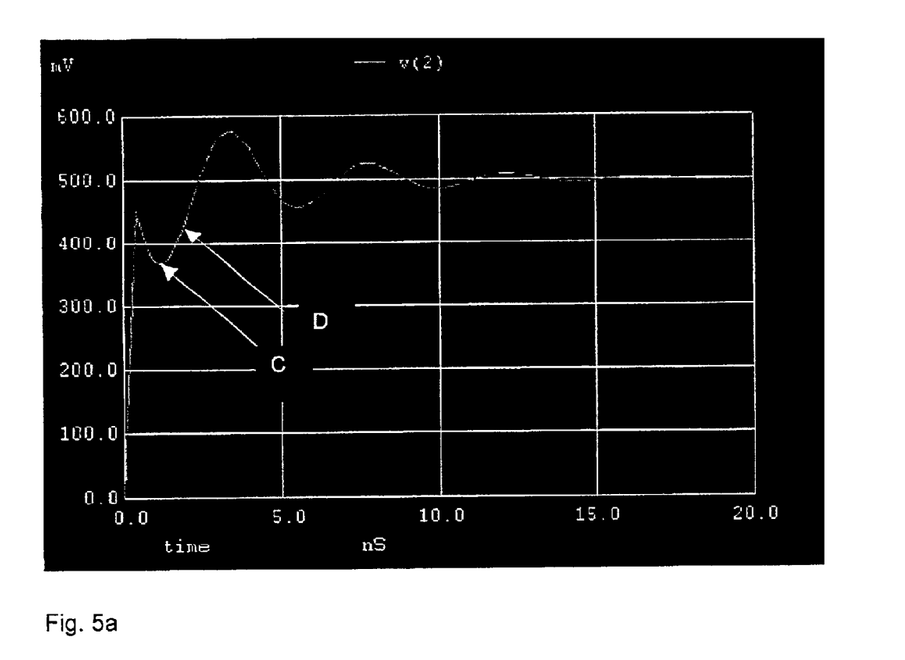
Figure 5B:
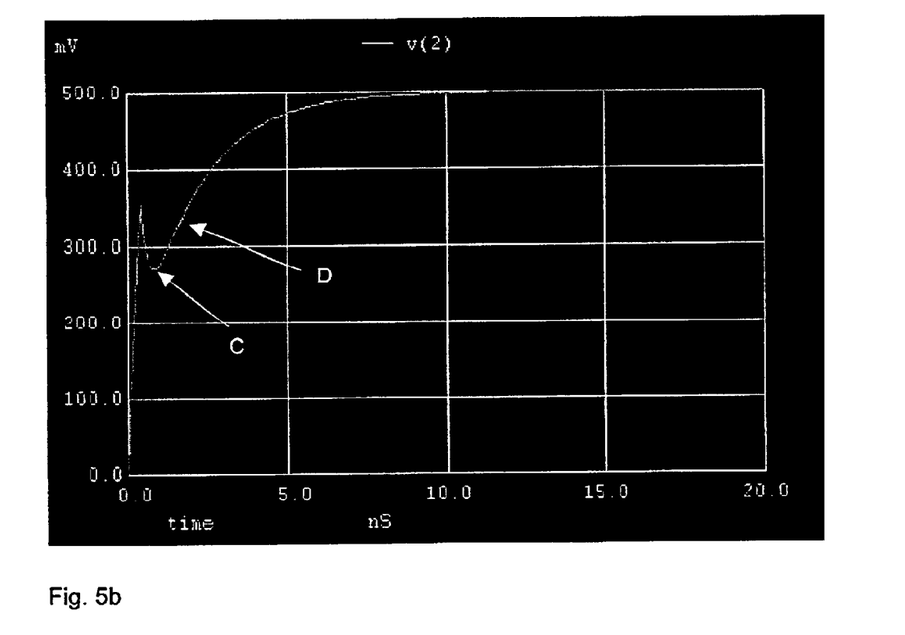

As a result of the pole-zero configuration shown in FIG. 4a, the preferred filter of second order reacts upon a step function in the data signal with a step response shown in FIG. 5a. As a result of the pole-zero configuration shown in FIG. 4b, the filter reacts upon a step function in the data signal with a step response shown in FIG. 5b. In both cases the criteria of having a dominant negative peak D with a relative minimum C after the initial rising edge B described in FIG. 1 are fulfilled. In case of the two conjugate complex poles, a damped oscillation results with several minima and maxima before reaching the steady state, as shown in FIG. 5a. The first dominant negative peak D with minimum C is the important peak for amplitude reduction in case of the oscillating step response. In case of two real poles it is a short-term amplitude reduction (peak) with a single minimum C before asymptotically approaching the steady state, as shown in FIG. 5b. It is the result of two superimposed exponential functions generated from the different locations of the poles on the real axis.

Figure 6:
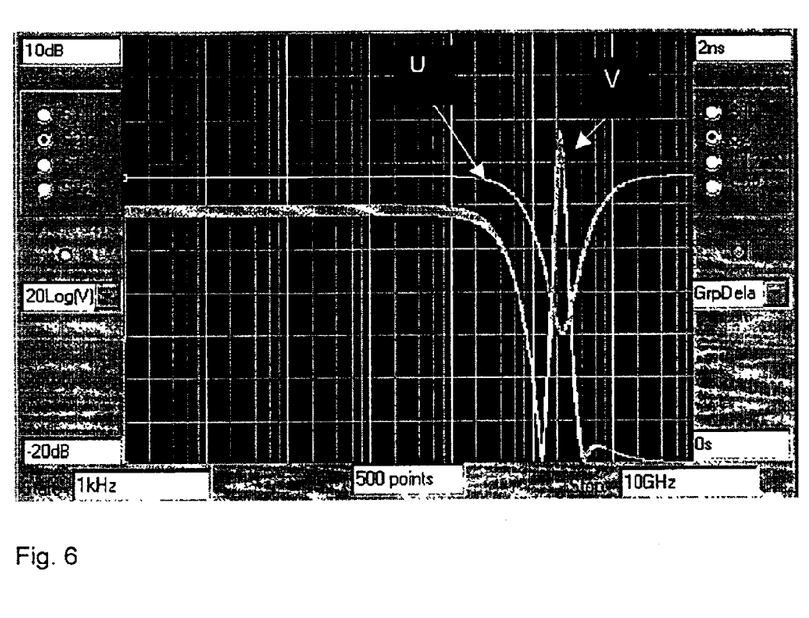

FIG. 6 shows the result of the pole-zero configuration of the preferred embodiment of the filter in the frequency domain. It shows a band rejection or notch filter operation in the magnitude characteristic (U) and a strong discontinuity in the group delay characteristic (V). Moving poles and zeros close to each other (small difference between α and β) means a small attenuation within the rejection band and a small discontinuity of the group delay which is equivalent to a weak negative peak (D) with a small negative minimum (C) in the step response. A large difference between α and β creates high attenuation in the rejection band and a strong discontinuity of the group delay which is equivalent to a strong negative peak (D) with a strong negative minimum (C) in the step response.

Moving the poles close to the imaginary axis means an oscillation with weak damping as in FIG. 5a. However, since the zeros need to be closer to the imaginary axis than the poles moving the poles towards the imaginary axis also reduces the pole zero difference and thus reduces the peak size of the dominant negative peak (D). Moving the poles on the unit circle towards the real axis increases the damping in the oscillation. Since the pole zero distance can be larger the attenuation in the pass band can be larger as well resulting in a stronger negative peak (D). Finally when moving the poles on the real axis creates the dominant negative peak without oscillation from exponential functions. In this case the pole zero distance can be even larger resulting in a relative minimum (C) that may almost touch the base line. However, this case is practically of less importance since a complete vertical eye closure is already reached when the relative minimum (C) reaches half of the steady state step amplitude value.

The location of the characteristic frequency (the location of the attenuation maximum) in the attenuation band is given by the real part of the conjugate complex zero $z_1$. This characteristic frequency determines the location of the relative minimum (C) on the time axis and therefore allows to adapt to the bit interval time of a given data rate.

Figure 7:
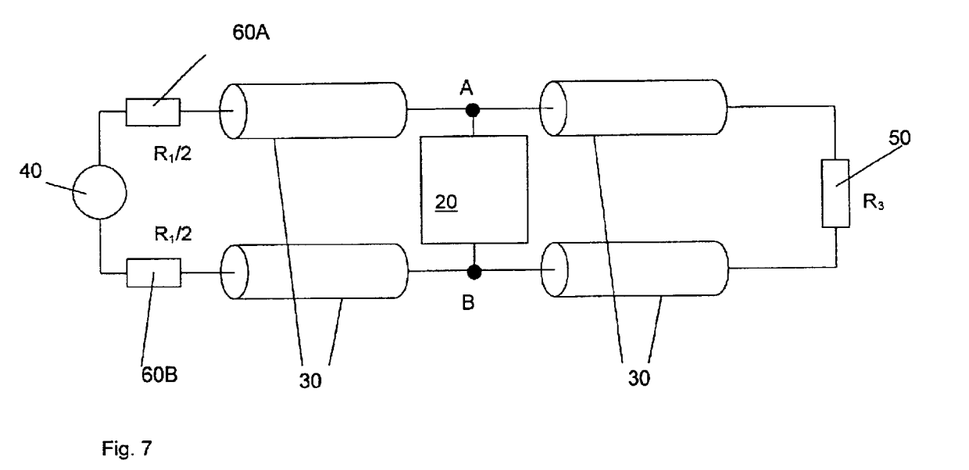
FIG. 7 shows an application example for the inventive jitter injection filtering.

FIG. 7 shows the preferred embodiment of a filter arrangement with a filter structure 20 according to the present invention for injecting data-dependent jitter and level noise. In the example of FIG. 7, the filter structure 20 is inserted between nodes A and B into a transmission line 30 carrying a data signal from a data source 40 to a data sink 50. The arrangement of data source 40, data sink 50, and transmission line 30 might be single-ended or differential. Source impedances 60A and 60B are shown for the sake of completeness.

Figure 8:
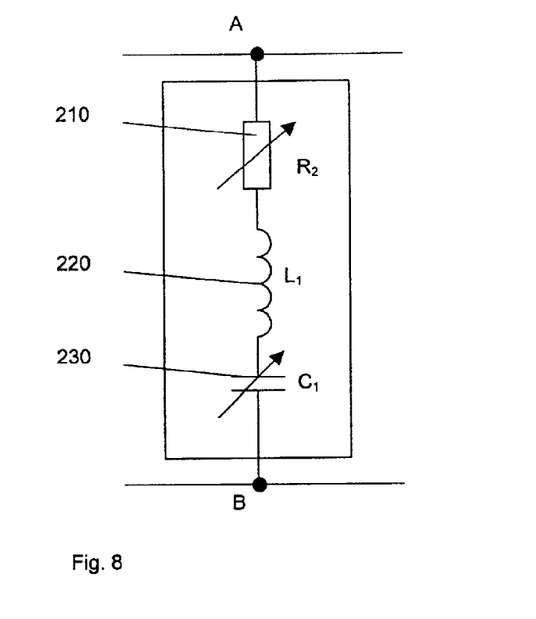
FIG. 8 shows a preferred embodiment for a jitter injection filter.

FIG. 8 shows a preferred embodiment of the filter structure 20 consisting of a single series resonance circuit of second order. The resonance circuit comprises a serial arrangement of a resistive element 210 with resistance value of $R_2$, an inductive element 220 with inductivity value of $L_1$, and a capacitive element 230 with capacitance value of $C_1$. In the example of FIG. 8, the resistive behavior $R_2$ of the resistor element 210 and the capacitive behavior $C_1$ of the capacitive element 230 can be varied.

The resistive, inductive and capacitive elements 210–230 may be implemented in any sequence and in various ways, e.g. the capacitive element 230 may be implemented as varactor diode, the resistive element 210 as a FET.

In the described arrangement of FIG. 8, the constant α is given by:

$$\alpha = R_2 \cdot \sqrt{\frac{C_1}{L_1}}$$

and the constant β is given by:

$$\beta = R_N \cdot \sqrt{\frac{C_1}{L_1}} \quad R_N = \frac{R_1 R_2 + R_1 R_3 + R_2 R_3}{R_1 + R_3}$$

In this preferred embodiment, the important size (C) of the dominant negative peak (D) is controlled by the pole zero distance expressed in the difference between the constants α and β and therefore by varying the value of the resistive element $R_2$ (210). This allows controlling the horizontal and vertical closure of the data eye as (amount of injected jitter and level noise). The characteristic frequency is given by:

$$\omega = \frac{1}{\sqrt{L_1 \cdot C_1}}$$

Therefore, varying the value $C_1$ of the capacitive element (210) allows a direct adaptation to the bit interval time of a given data rate.

Figure 9:
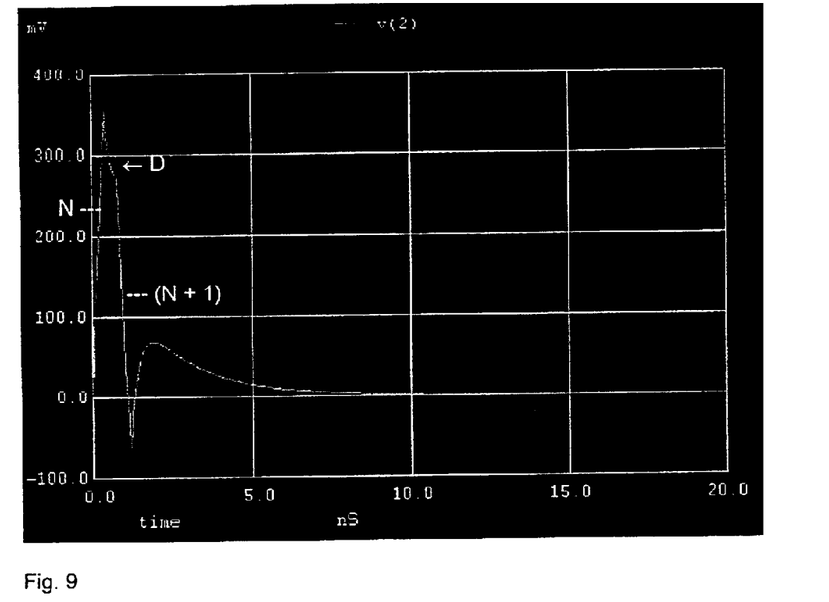
FIGS. 9–11 illustrate the behavior of the filter of FIG. 8.
Figure 10:
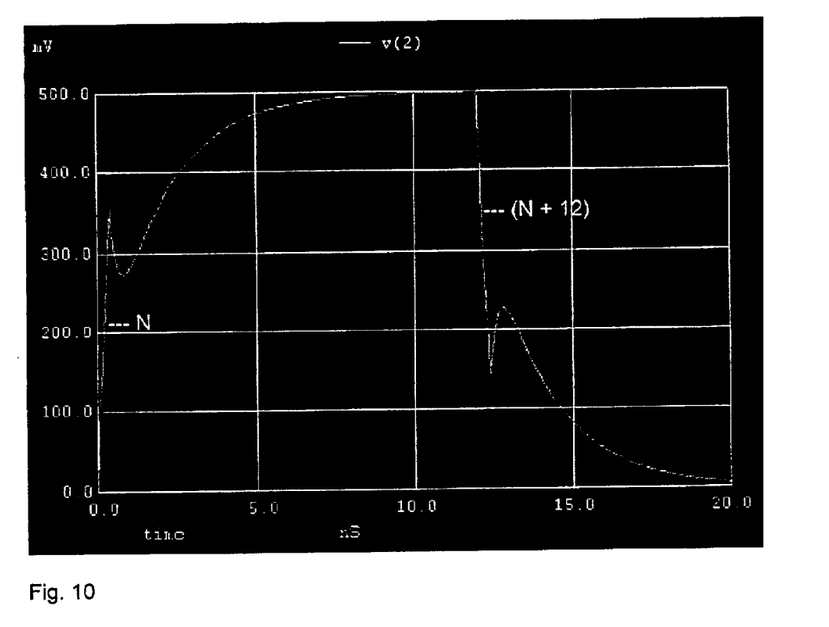
Figure 11:
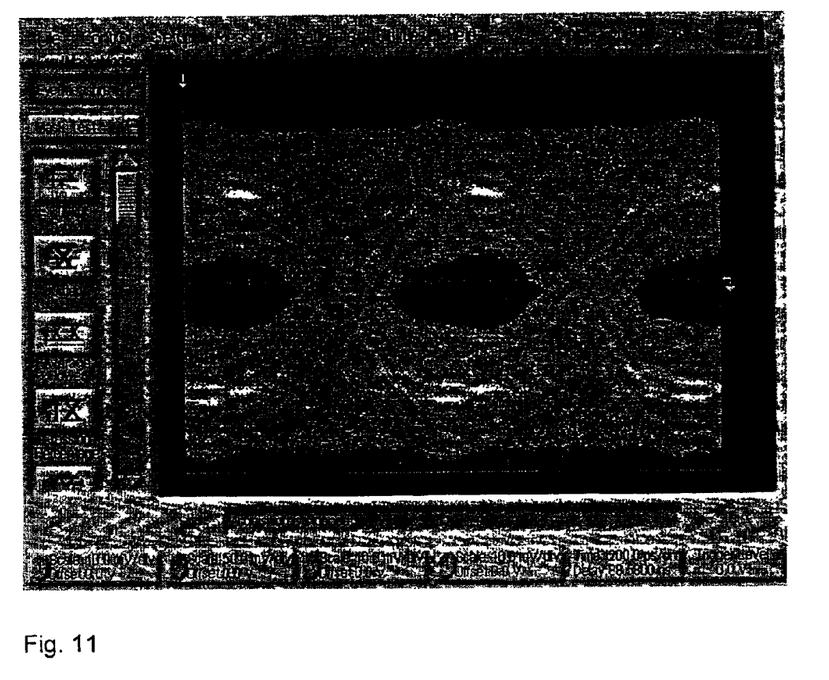

FIGS. 9–11 show the operation of the preferred embodiment described in FIGS. 7 and 8. The step response of a single step response with a relative minimum according to the desired eye closure and a location in time matched to the bit interval time of the given data rate corresponds to FIG. 5b. FIG. 9 shows a short run length situation (run length l), and FIG. 10 shows a long run length situation (run length 12). FIG. 11 depicts the resulting data eye from a real measurement with a filter according to the invention.

The peak jitter ΔJ can be calculated based on a rise/fall time $t_{r/f}$ of the data signal. An assumption is made that introducing a limited rise/fall time instead of a step with infinite rise/fall time does not significantly change the size ΔV of the dominant negative peak:

$$\Delta J = \frac{\Delta V}{t_{r/f}}$$

By varying the value $C_1$ of the capacitive element, the filter 20 can be dimensioned in an iterative process such that a location $\Delta t_{min}$ of the relative minimum C matches with the bit interval time Δt of the given data rate. In a next step, the size ΔV of the dominant negative peak D at the location of the relative minimum can be adjusted in a way that the peak jitter ΔJ is of the desired value (given a rise/fall time $t_{r/f}$), and an appropriate horizontal and vertical eye closure is generated.

It goes without saying that the serial arrangement of FIG. 8 can be replaced by an equivalent parallel resonance circuit, e.g., serially coupled between the ends of an opened node A and B.

Adding the filter 20 into the loopback path or into the stimulus path e.g. of a high speed pin card thus allows to precisely generate eye closure by injecting controlled amounts of jitter and level noise. This helps solving the test challenge at lowest cost. Horizontal and vertical eye closure resulting from the injected jitter and level noise can be provided variable and the filter can be adapted to different data rates.

It is clear that the invention can be partly or entirely embodied or supported by one or more suitable software programs, which can be stored on or otherwise provided by any kind of data carrier, and which might be executed in or by any suitable data processing unit. In particular, software tools can be employed for calculating filter elements and characteristics or to simulate filter behaviors.

What is claimed is:

1. A filter for injecting data dependent jitter and level noise into a digital data signal with a given data rate comprising:

circuitry for reacting on a step function with a step response showing after a first increase or decrease a substantial extreme value of opposite direction than the first increase or decrease, whereby the temporal occurrence of the substantial extreme value with respect to the step function is substantially in the range of the given data rate.

2. The filter of claim 1, wherein the filter is of at least second order.

3. The filter of claim 2, wherein the filter comprises a resistive element with resistance value of $R_2$, an inductive element with an inductivity value of $L_1$, and a capacitive element with capacitance value of $C_1$.

4. The filter of claim 3, wherein the resistive value of $R_2$ and/or the capacitive value of $C_1$ can be varied.

5. The filter of claim 3, wherein the resistive element, the inductive element, and the capacitive element are coupled as a resonance circuit.

6. The filter of claim 2 comprising a resistive element and at least two elements of capacitive and/or inductive behavior.

7. The filter of claim 2, wherein both zeros of the second order filter are located on the unit circle, and both zeros are closer to the imaginary axis than the poles or the poles are located on the real axis.

8. A method comprising using the filter according to claim 1 for injecting data dependent and level noise into a digital data signal with a given data rate.

9. A jitter injection filter for injecting data dependent and level noise into a digital data signal with a given data rate comprising:

circuitry for reacting on an increasing step function with a step response showing at least one substantial minimum after a first increase, whereby the temporal occurrence of the at least one substantial minimum from the step function is substantially in the range of the given data rate.

10. A method for injecting data dependent jitter and level noise into a digital data signal with a given data rate comprising:

reacting on a step function with a step response showing after a first increase or decrease a substantial extreme value of opposite direction than the first increase or decrease, whereby the temporal occurrence of the substantial extreme value with respect to the step function is substantially in the range of the given data rate.

11. A method for injecting data dependent jitter and level noise into a digital data signal with a given data rate, the method comprising:

applying the digital data signal to a filter reacting on a step function with a step response showing after a first increase or decrease a substantial extreme value of opposite direction than the first increase or decrease, and     adjusting the filter so that the temporal occurrence of the substantial extreme value with respect to the step function is substantially in the range of the given data rate.

12. A software program or product stored on a data carrier, for executing a method for injecting data dependent jitter and level noise into a digital data signal with a given data rate when run on a data processing system, the method comprising:

applying the digital data signal to a filter reacting on a step function with a step response showing after a first increase or decrease a substantial extreme value of opposite direction than the first increase or decrease, and     adjusting the filter so that the temporal occurrence of the substantial extreme value with respect to the step function is substantially in the range of the given data rate.

\* \* \* \* \*